(12) United States Patent
Kurihara

(10) Patent No.: US 10,428,835 B2
(45) Date of Patent: Oct. 1, 2019

(54) FAN AND AIR-CONDITIONING APPARATUS

(71) Applicant: Mitsubishi Electric Corporation, Tokyo (JP)

(72) Inventor: Makoto Kurihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 15/535,917

(22) PCT Filed: Apr. 1, 2015

(86) PCT No.: PCT/JP2015/060357
§ 371 (c)(1),
(2) Date: Jun. 14, 2017

(87) PCT Pub. No.: WO2016/157471
PCT Pub. Date: Oct. 6, 2016

(65) Prior Publication Data
US 2017/0343014 A1    Nov. 30, 2017

(51) Int. Cl.
*F04D 29/66* (2006.01)
*F04D 29/28* (2006.01)
(Continued)

(52) U.S. Cl.
CPC ......... *F04D 29/662* (2013.01); *F04D 29/281* (2013.01); *F16F 15/34* (2013.01); *G01M 1/36* (2013.01)

(58) Field of Classification Search
CPC .... F04D 29/281; F04D 29/662; F04D 29/668; F05D 2260/96
See application file for complete search history.

(56) References Cited

U.S. PATENT DOCUMENTS 3,315,750 A    4/1967 Delaney
4,025,231 A *  5/1977 Kochevar ............. F04D 29/388
                                                416/144
(Continued)

FOREIGN PATENT DOCUMENTS

CN    205478533 U    8/2016
JP    2008-082212 A  4/2008
JP    2011-190806 A  9/2011

OTHER PUBLICATIONS

Office Action dated Feb. 2, 2018 issued in corresponding CN patent application No. 201610118398.8 (and English translation).
(Continued)

*Primary Examiner* — Ninh H. Nguyen
(74) *Attorney, Agent, or Firm* — Posz Law Group, PLC

(57) ABSTRACT

A fan of the invention includes an impeller having a plurality of blades and rotating around a rotation axis, and at least one balance weight having at least one claw portion and attached to the impeller to correct the center of gravity of the impeller. The impeller has a circumferential convex portion formed along the circumferential direction, and on which the claw portion is hooked to restrict a range of movement of the balance weight in the radial direction of the impeller, and at least one radial concave-convex portion formed along the radial direction, and on which the claw portion is hooked to restrict the range of movement of the balance weight in the circumferential direction of the impeller.

7 Claims, 6 Drawing Sheets

(51) Int. Cl.
  *G01M 1/36* (2006.01)
  *F16F 15/34* (2006.01)

(56) References Cited

U.S. PATENT DOCUMENTS

| | | | | |
|---|---|---|---|---|
| 5,591,008 A * | 1/1997 | Wrobel | ................ | F04D 29/662 |
| | | | | 416/144 |
| 6,530,747 B1 * | 3/2003 | Schneider | ............. | F04D 29/662 |
| | | | | 24/350 |
| 10,018,206 B2 * | 7/2018 | Moll | ..................... | F04D 29/662 |
| 2008/0075596 A1 | 3/2008 | Kitamura | | |
| 2011/0223007 A1 | 9/2011 | Hammel et al. | | |

OTHER PUBLICATIONS

Communication pursuant to Article 94(3) EPC dated Nov. 9, 2017 issued in corresponding EP application No. 15868654.3.
International Search Report of the International Searching Authority dated Jun. 23, 2015 for the corresponding International application No. PCT/JP2015/060357(and English translation).
Extended European Search Report dated Mar. 3, 2017 for EP application No. 15868654.3.

* cited by examiner

FAN AND AIR-CONDITIONING APPARATUS

CROSS REFERENCE TO RELATED APPLICATION

This application is a U.S. national stage application of International Application No. PCT/JP2015/060357, filed on Apr. 1, 2015, the contents of which are incorporated herein by reference.

TECHNICAL FIELD

The present invention relates to a fan or the like used in an air-conditioning apparatus or the like. The invention particularly relates to a fan or the like, in which a balance weight is attached to an impeller to correct the center of gravity.

BACKGROUND

For example, in a fan that blows out air, an impeller which has blades (vanes) and rotates around a rotation axis to generate a flow of air, is a significant part that greatly influences performance. When the center of gravity of the impeller is shifted (mass eccentricity) (the center of gravity is in a position other than the rotation axis), rotation of the impeller causes a large vibration. Hence, users feel discomfort from the vibration of the impeller, noise from the vibration, and the like.

Against this background, a technique has been proposed (see Patent Literature 1, for example), in which a balance weight (a weight) is attached to an impeller so that the position of the center of gravity of the impeller coincides with the rotation axis. Since the position of the center of gravity often differs among impellers, the balance weight is attached to a corresponding position according to each of the impellers.

PATENT LITERATURE

Patent Literature 1: Japanese Unexamined Patent Application Publication No. 2011-190806

Even if the mass eccentricity is corrected, a change in the position of the balance weight during use or handling of the impeller recreates the mass eccentricity in the impeller. Hence, it is very significant to avoid shifting of the position of the balance weight. In a conventional fan, an attached balance weight is fixed to an impeller by adhering with an adhesive or crimping, to avoid shifting of the position.

However, to fix the balance weight to the impeller, work such as applying of an adhesive is generated. Also, after attaching the balance weight to the impeller, it takes time for the adhesive to dry up. Accordingly, there have been limitations in attaching the balance weight efficiently.

SUMMARY

The invention has been made to solve the above problems, and aims to achieve a fan or the like that facilitates more efficient attachment of a balance weight.

A fan of the invention includes an impeller having a plurality of blades and rotating around a rotation axis, and at least one balance weight having at least one claw portion and attached to the impeller to correct the center of gravity of the impeller. The impeller has a circumferential concave-convex portion formed along the circumferential direction, and on which the claw portion is hooked to restrict movement of the balance weight in the radial direction of the impeller, and at least one radial concave-convex portion formed along the radial direction, and on which the claw portion is hooked to restrict movement of the balance weight in the circumferential direction of the impeller.

Also, an air-conditioning apparatus of the invention includes the above described fan.

Advantageous Effects of Invention

According to the fan of the invention, since the concave-convex portions are provided in the fan to restrict movement of the attached balance weight, the balance weight need not be fixed to prevent shifting and detachment thereof. In particular, by providing the radial concave-convex portion, shifting in the circumferential direction can also be prevented, so that the occurrence of the mass eccentricity can be suppressed.

DETAILED DESCRIPTION

Figure 1:
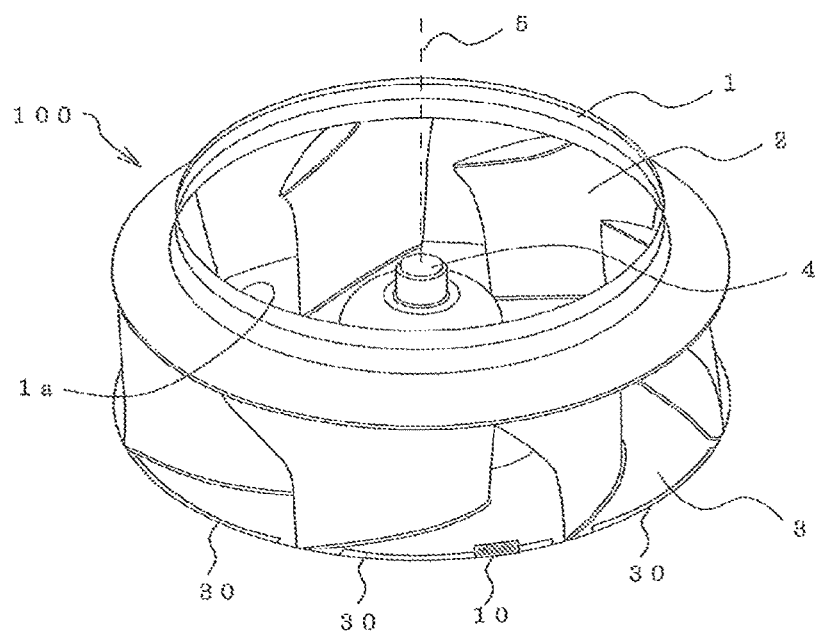
FIG. 1 is a perspective view of a configuration of an impeller 100 of a fan of Embodiment 1 of the invention.

Embodiments of the present invention will be described hereinafter with reference to the drawings. Regarding the reference numerals, in the following drawings, parts assigned the same reference numerals are the same or equivalent parts, and the same holds for the entire specification. Forms of components described in the entire specification are only examples, and the invention is not limited to the forms described in the specification. In particular, combinations of the components are not limited to only each of the Embodiments, and components described in one of the Embodiments are applicable to another one of the Embodiments. In addition, the reference numeral of multiple blades is assigned to only one typical blade. The number of blades illustrated in the drawings is an example. Moreover, the description is given by referring to the upper direction in the drawings as "upper side" and the lower direction in the drawings as "lower side", In the drawings, the relation among sizes of component members may differ from the actual relation.

Embodiment 1

FIG. 1 is a perspective view illustrating a configuration of an impeller 100 of a fan of Embodiment 1 of the invention. In the description of Embodiment 1, the fan is assumed to be a turbo fan, which is a centrifugal fan. The impeller 100 of the turbo fan will be described. As shown in FIG. 1, the impeller 100 includes multiple (seven in FIG. 1) blades (vanes) 2 between a shroud (a side plate) 1 and a main plate 3.

The shroud 1 has a bell-mouth shape, and has an air suction port 1a, The blade 2 of Embodiment 1 is a three-dimensional blade, which has a twisted shape between the shroud 1 and the main plate 3. For this reason, for example, noise and power consumption can be reduced. Also, the impeller 100 has a boss 4 at the center of the main plate 3. The boss 4 is the rotation center (a rotation axis 5). The impeller 100 is rotated by attaching a drive unit (e.g., a fan motor) to the boss 4. Rotation of the impeller 100 around the rotation axis 5 causes gas (e.g., air) to flow in from the rotation axis 5 direction, and causes the flowed-in gas to be blown out in the circumferential direction intersecting the rotation axis 5. The shroud 1, the blade 2, and the main plate 3 are made, for example, of resin.

Figure 2:
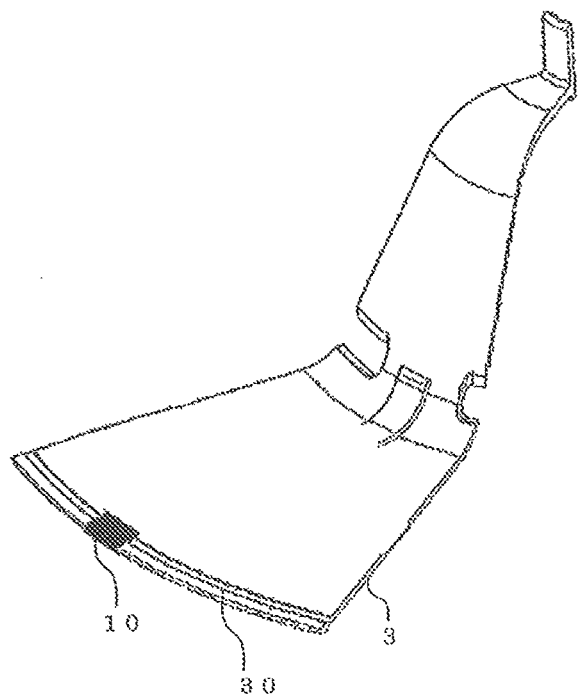
FIG. 2 is a diagram illustrating a balance weight 10 attached to the fan of Embodiment 1 of the invention.

FIG. 2 is a diagram describing a balance weight 10 attached to the fan of Embodiment 1 of the invention. As shown in FIGS. 1 and 2, the fan of Embodiment 1 has the balance weight 10 on the impeller 100. The balance weight 10 is a weight for keeping the balance of rotation, such that the position of the center of gravity of the impeller 100 coincides with the rotation axis 5. In Embodiment 1, the balance weight 10 is attached to the periphery of the main plate 3.

Figure 3:
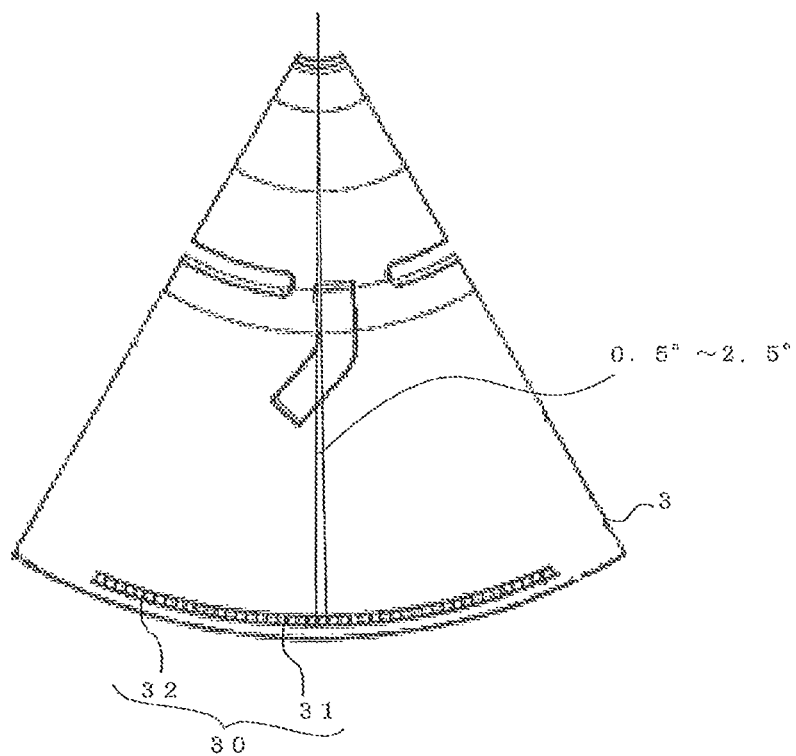
FIG. 3 is a diagram describing a convex portion 30 included in a main plate 3 of Embodiment 1 of the invention.

FIG. 3 is a diagram describing a convex portion 30 included in the main plate 3 of Embodiment 1 of the invention. FIG. 3 illustrates a part of the main plate 3 as viewed from the upper side in FIG. 1. As shown in FIG. 3, the fan of Embodiment 1 has the convex portion 30 in a peripheral region of the main plate 3, and therefore has a concave-convex portion (a stepped part) in which a depression and a projection are formed. The convex portion 30 is a convex part of the concave-convex portion, and has a circumferential convex portion 31 and a radial convex portion 32. The circumferential convex portion 31 is a convex portion, which is formed such that the convex shape extends along the circumferential direction. The circumferential convex portion 31 forms, at least on the inner side (a side of the rotation axis 5) of the circumferential convex portion 31, a step (a wall) on which a claw portion 11 of the balance weight 10 can be hooked, as will be described later. In some cases, a depression (a depression portion) may further be formed on the inner side (the side of the rotation axis 5) of the circumferential convex portion 31, to enlarge the step (heighten the wall). Since the claw portion 11 is hooked on the wall formed of the circumferential convex portion 31, the balance weight 10 is locked, and its radial movement can be restricted. Hence, the circumferential convex portion 31 prevents the balance weight 10 from, for example, being shifted in the radial direction by force such as centrifugal force, or falling off the main plate 3. The shape (the cross-sectional shape) of the circumferential convex portion 31 may be triangular or rectangular or the like, and is not particularly limited, as long as the shape can prevent movement such as shifting and detachment of the balance weight 10.

Figure 4:
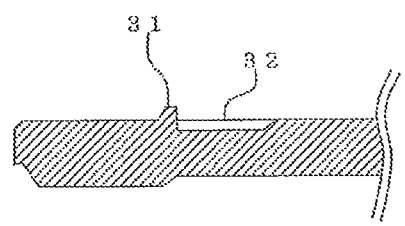
FIG. 4 is a diagram describing the outline of a peripheral region of the main plate 3 including the convex portion 30 of Embodiment 1 of the invention.

FIG. 4 is a diagram describing the outline of a peripheral region of the main plate 3 including the convex portion 30 of Embodiment 1 of the invention. The fan of Embodiment 1 has the radial convex portion 32 in a part which recessed by the wall formed of the circumferential convex portion 31, on the inner side (the side of the rotation axis 5) of the circumferential convex portion 31. The radial convex portion 32 is a convex portion, which is formed such that the convex shape extends along the radial direction. The radial convex portion 32 restricts circumferential movement of the balance weight 10, and prevents the balance weight 10 from being shifted in the circumferential direction.

An interval between the radial convex portions 32 is set, for example, such that an angle formed by two adjacent radial convex portions 32 and the rotation axis 5 of the fan is not smaller than 0.5 degrees, and not larger than 2.5 degrees as in FIG. 3. Also, the shape (the cross-sectional shape) of the radial convex portion 32 may also be triangular or rectangular or the like, and is not particularly limited, as long as the shape can prevent movement such as shifting of the balance weight 10.

In the main plate 3 of Embodiment 1, the convex portion 30 is formed in parts of the peripheral region of the main plate 3, where the balance weight 10 can be attached. Accordingly, it is possible to keep a worker from attempting to attach the balance weight 10 to a position where attachment is difficult, such as a position where the blade 2 hinders attachment of the balance weight 10. Additionally, the height of the convex shape of the radial convex portion 32 is set not larger than the height of the convex shape of the circumferential convex portion 31, and the position of the vertex of the convex shape of the radial convex portion 32 is set lower than the position of the vertex of the convex shape of the circumferential convex portion 31, for example.

Figure 5:
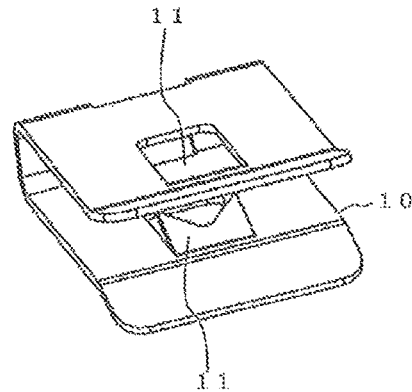
FIG. 5 is a perspective view of the balance weight 10 of Embodiment 1 of the invention.

FIG. 5 is a perspective view of the balance weight 10 of Embodiment 1 of the invention. The balance weight 10 of Embodiment 1 is formed into a U shape. Also, as described above, the balance weight 10 has the claw portion 11. The balance weight 10 of Embodiment 1 has paired claw portions 11 on both surfaces into which the main plate 3 is inserted. Hence, the claw portions 11 can be hooked on both of surfaces of the peripheral region of the main plate 3. Moreover, with the claw portions 11 provided on both surfaces, even when the convex portion 30 is provided on one side of the peripheral region of the main plate 3 as in Embodiment 1, the worker can insert the main plate 3 without regard for the claw portion 11. Also, the claw portion 11 is resilient. The width of the claw portion 11 is narrower than the interval between the radial convex portions 32.

Figure 6:
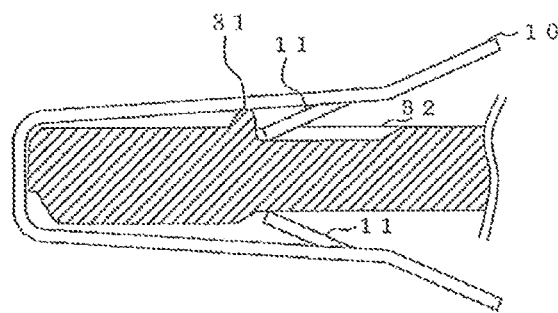
FIG. 6 is a diagram illustrating a cross-sectional shape of the main plate 3 and the balance weight 10 attached to the main plate 3 of Embodiment 1 of the invention.

FIG. 6 is a diagram illustrating a cross-sectional shape of the main plate 3 and the balance weight 10 attached to the main plate 3 of Embodiment 1 of the invention. For example, when attaching the balance weight 10, the worker inserts it from the U-shaped opening portion so that the peripheral region of the main plate 3 is sandwiched by the balance weight 10. The claw portion 11 is resilient. After the claw portion 11 passes over the circumferential convex portion 31, for example, the claw portion 11 on the upper side of the main plate 3 fits into a depression, which is shaped by the step formed by the circumferential convex portion 31 and the like on the inner side (the side of the rotation center) of the circumferential convex portion 31. Since the claw portion 11 is fitted into the depression, radial movement (a movement range) of the balance weight 10 is restricted, and movement such as shifting and detachment can be prevented. Accordingly, for example, the attached balance weight 10 need not be deformed and crimped to be fixed, so that manufacturing time can be reduced.

Meanwhile, for example, the claw portion 11 fitted between the radial convex portions 32 is unable to pass over the radial convex portion 32. Hence, circumferential movement of the balance weight 10 is restricted, and shifting can be prevented.

As described above, according to the fan of Embodiment 1, since the convex portion 30 is provided on the peripheral region of the main plate 3 to restrict movement of the attached balance weight 10, shifting and detachment can be prevented. Also, the fan of Embodiment 1 is provided not only with the circumferential convex portion 31, which prevents shifting and detachment in the radial direction, but also the radial convex portion 32, which prevents shifting in the circumferential direction. Therefore, shifting in the circumferential direction can also be prevented. Additionally, since the angle formed by two adjacent radial convex portions 32 and the rotation center of the fan is set not smaller than 0.5 degrees, and not larger than 2.5 degrees, the center of gravity can be corrected appropriately.

Embodiment 2

Figure 7:
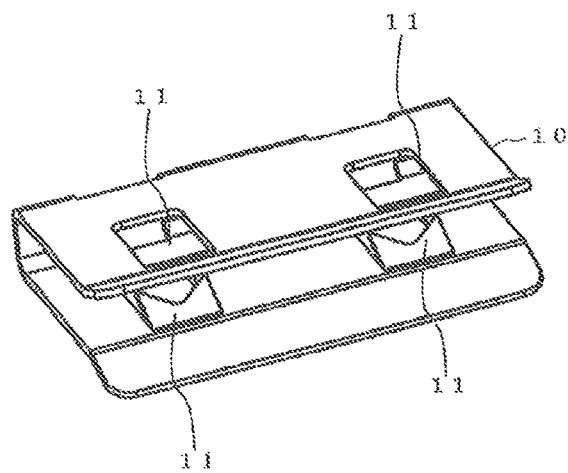
FIG. 7 is a perspective view of a balance weight 10 of Embodiment 2 of the invention.
Figure 8:
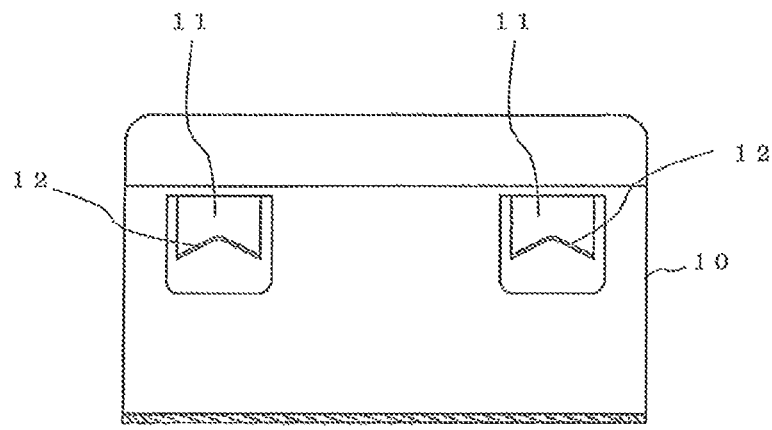
FIG. 8 is a diagram illustrating the balance weight 10 of Embodiment 2 of the invention as viewed from the upper side.

FIG. 7 is a perspective view of a balance weight 10 of Embodiment 2 of the invention. FIG. 8 is a diagram illustrating the balance weight 10 of Embodiment 2 of the invention as viewed from the upper side. For example, the balance weight 10 has a claw portion 11 as described in Embodiment 1. In here, to allow the balance weight 10 to be hooked on the fan (the main plate 3) at multiple points, the balance weight 10 has paired claw portions 11 in multiple parts (two parts in Embodiment 2) of the balance weight 10. Accordingly, multiple claw portions 11 are arranged side by side on the same surface. Although not particularly described in Embodiment 1 above, for example, a tip end portion 12 of the claw portion 11 of the balance weight 10 has a bifurcated shape.

Figure 9:
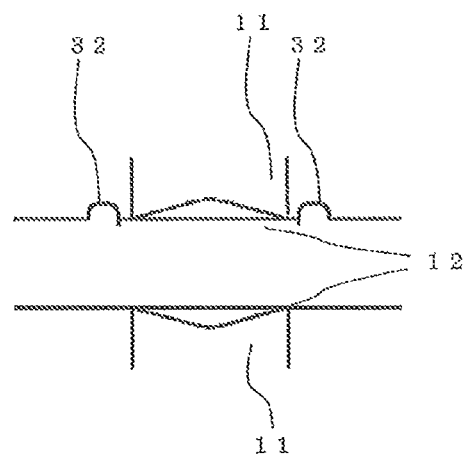
FIG. 9 is a diagram (No. 1) describing a positional relation between claw portions 11 of the balance weight 10 and radial convex portions 32 of Embodiment 2 of the invention.
Figure 10:
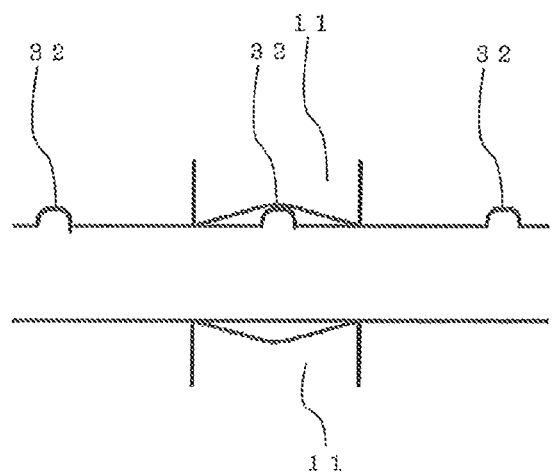
FIG. 10 is a diagram (No. 2) describing the positional relation between the claw portions 11 of the balance weight 10 and the radial convex portions 32 of Embodiment 2 of the invention.

FIGS. 9 and 10 are diagrams describing a positional relation between the claw portions 11 of the balance weight 10 and radial convex portions 32 of Embodiment 2 of the invention. As described above, the width of the claw portion 11 is narrower than the interval between the radial convex portions 32. Hence, the attached balance weight 10 becomes stable, when the claw portion 11 fits into a depression formed between the radial convex portions 32 as in FIG. 9. Meanwhile, while the worker is doing attachment work, the claw portion 11 sometimes does not fit properly between the radial convex portions 32. When the tip end portion 12 of the claw portion 11 is bifurcated in such a case, although the claw portion 11 is not fitted into the depression, the claw portion 11 straddles the radial convex portion 32 as in FIG. 10, and can thereby restrict circumferential movement of the balance weight 10. As described above, by setting the height of the convex shape of the radial convex portion 32 not larger than the height of the convex shape of the circumferential convex portion 31, the claw portion 11 can more easily straddle the radial convex portion 32.

Figure 11:
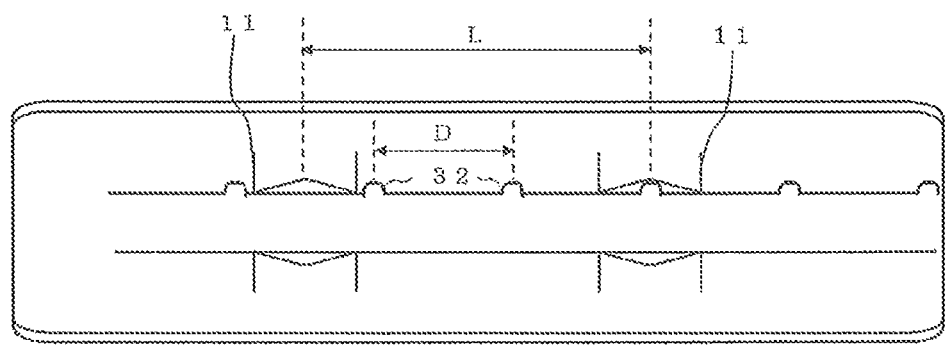
FIG. 11 is a diagram describing the relation of distance between the claw portions 11 of the balance weight 10 to an interval between the radial convex portions 32 of Embodiment 2 of the invention.

FIG. 11 is a diagram describing the relation of distance between centers of the claw portions 11 of the balance weight 10 to an interval between centers of the radial convex portions 32 of Embodiment 2 of the invention. Assume that the distance between centers of the claw portions 11 is L, and the interval between centers of the radial convex portions 32 is D. In the balance weight 10 of Embodiment 2, assume that the relation of the distance L between centers of two of the multiple claw portions 11 to the interval D between centers of the radial convex portions 32 satisfies L(n+0.5)×D. In here, n is a natural number. When this relation is satisfied, at least one of the multiple claw portions 11 fits between the radial convex portions 32.

For example, in the balance weight 10 of FIG. 11, two pairs of the claw portions 11 are formed in such a manner that the interval between centers of the claw portions satisfies a relation of L=2.5D. When the relation satisfies L(n+0.5)×D, one claw portion 11 fits between the radial convex portions 32. Two claw portions 11 are arranged side by side on the same surface, and only one claw portion 11 straddles the radial convex portion 32. Hence, the balance weight 10 can be attached stably.

As described above, according to the fan of Embodiment 2, since the tip end portion of the claw portion 11 of the balance weight 10 is formed into the bifurcated shape, it can straddle the radial convex portion 32. Thus, the claw portion 11 can restrict radial movement of the balance weight 10, even if the claw portion 11 does not fit into the depression between the radial convex portions 32. Accordingly, the worker does not need to reattach the balance weight 10, and work efficiency can be improved.

Also, since the height of the convex shape of the radial convex portion 32 is set not larger than the height of the convex shape of the circumferential convex portion 31, the claw portion 11 can straddle the radial convex portion 32 more easily.

Further, when the balance weight 10 has the claw portions 11 in multiple parts thereof, the balance weight 10 is configured such that the distance L between centers of the claw portions 11 satisfies L(n+0.5)×D, with respect to the interval D between centers of the radial convex portions 32. Accordingly, at least one claw portion 11 fits into the depression between the radial convex portions 32. Hence, the balance weight 10 can be attached stably.

Embodiment 3

Although the above Embodiment 1 describes a case in which the convex portion 30 is provided on the main plate 3, and the balance weight 10 is attached to the main plate 3, the invention is not limited thereto. For example, the convex portion 30 may be provided in the shroud 1 or he blade 2 to allow attachment of the balance weight 10.

Also, although the convex portion 30 is provided on the upper side (a side that comes into contact with blade 2) of the main plate 3 in the above Embodiment 1, the invention is not limited thereto. For example, another convex portion 30 may be provided on the lower side of the main plate 3, so that the convex portion 30 is provided on both sides of the main plate 3.

Also, although the above Embodiment 1 describes that the stepped part is formed by shaping the convex portion 30 with focusing on the convex shape of the concave-convex portion, the invention is not particularly limited thereto. For example, a stepped part on which the claw portion 11 of the balance weight 10 can be hooked may be formed by shaping a depression portion with focusing on the depression shape of the concave-convex portion on the main plate 3 or other parts.

Also, Embodiment 1 describes a case in which the fan is a turbo fan. The invention is not limited to this, and is applicable to other kinds of fans, such as a centrifugal fan like a sirocco fan, and a line flow fan.

Embodiment 4

Figure 12:
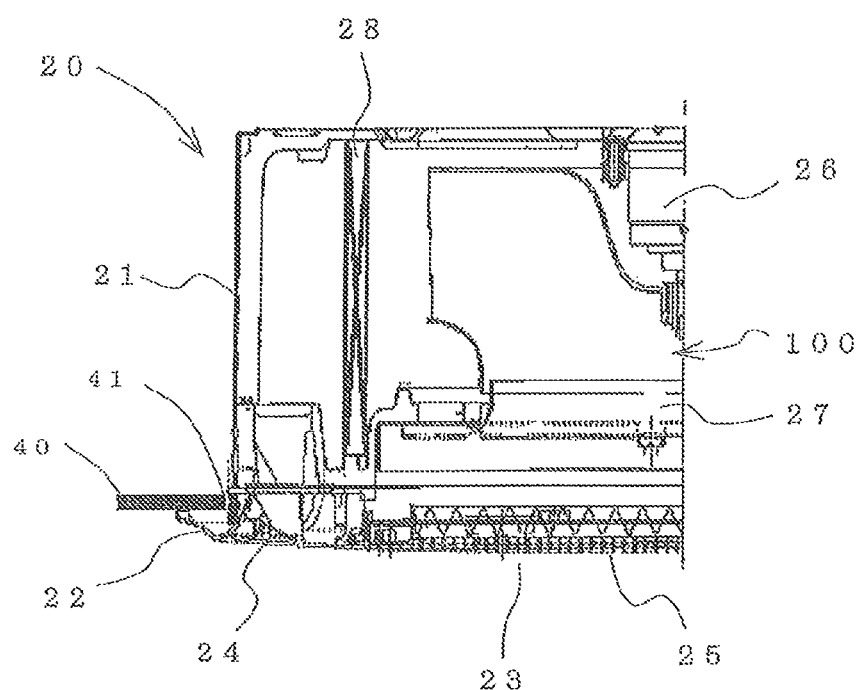
FIG. 12 is a diagram illustrating an air-conditioning apparatus of Embodiment 4 of the invention.

FIG. 12 is a diagram illustrating an air-conditioning apparatus of Embodiment 4 of the invention. Of the equipment constituting the air conditioner, FIG. 12 illustrates a partial cross-sectional view of a configuration of a ceiling-embedded indoor unit. In FIG. 12, function parts that are the same as those of the above Embodiment 1 and other Embodiments, are assigned the same reference numerals.

A ceiling-embedded indoor unit 20 of Embodiment 4 is buried on the back side of a ceiling 40, and its lower opening port is exposed from an opening port 41 of the ceiling 40. Additionally, a decorative panel 22, which has an air inlet port 23 and an air outlet port 24, is attached in such a manner as to extend from a lower opening port of a main body casing 21 to the periphery of the opening port 41 of the ceiling 40. A filter 25 is arranged on the downstream side of air of the air inlet port 23.

A fan motor 26 of a fan is attached to a top plate of the main body casing 21. The fan is arranged such that an air suction port 1a of a shroud 1 is positioned on a side of the air inlet port 23 of the decorative panel 22, and a boss 4 of an impeller 100 of the fan is fixed to an output shaft of the fan motor 26. A bell mouth 27 is provided between the air inlet port 23 of the decorative panel 22 and the air suction port 1a of the shroud 1 of the impeller 100 in the fan. Also, a heat exchanger 28 is provided on the outer periphery side of the downstream side of air of the impeller 100 in the fan whose air flow route is from the air inlet port 23 to the air outlet port 24.

When the air-conditioning apparatus having the ceiling-embedded indoor unit 20 as described above starts operation, the fan motor 26 of the fan is rotatingly driven, and the impeller 100 fixed to the fan motor 26 rotates. Rotation of the impeller 100 causes indoor air to be sucked in from the air inlet port 23, cleaned by the filter 25, flow into the impeller 100 through the bell mouth 27, and flow out to the outer periphery side from between blades 2. The air flowing out from the impeller 100 passes through the heat exchanger 28 where the air is turned into conditioned air, which is cool air or warm air, and is blown out into a room through the air outlet port 24.

According to the air-conditioning apparatus of Embodiment 4, since the fan using the impeller 100 described in the above Embodiments 1 to 3 is employed, an air-conditioning apparatus having high operation efficiency can be achieved.

Although the above describes a case of using the fan of the invention in the indoor unit of the air-conditioning apparatus illustrated in FIG. 12, the invention is not limited thereto, and may be used in indoor units having other structures. Moreover, the fan of the invention may also be used in devices such as an outdoor unit of an air-conditioning apparatus, and an air cleaner.

The invention claimed is:

1. A fan comprising:
   an impeller having a plurality of blades and rotating around a rotation axis; and
   at least one balance weight having at least one claw portion and attached to the impeller to correct a center of gravity of the impeller, wherein
   the impeller includes
      a circumferential concave-convex portion formed along a circumferential direction, the at least one claw portion being engaged with the impeller such that the circumferential concave-convex portion restricts movement of the at least one balance weight in a radial direction of the impeller,
      at least one radial concave-convex portion formed along the radial direction, the at least one claw portion being engaged with the impeller such that the at least one radial concave-convex portion restricts movement of the at least one balance weight in the circumferential direction of the impeller, and
      the at least one claw portion comprises a plurality of claw portions,
   the at least one radial concave-convex portion comprises a plurality of radial concave-convex portions,
   the at least one balance weight has the plurality of the claw portions on a same surface, and
   when an interval between centers of adjacent radial concave-convex portions of the plurality of radial concave-convex portions is D, and n is a natural number, a distance L between centers of two of the plurality of claw portions on the same surface satisfies $L=(n+0.5) \times D$.

2. The fan of claim 1, wherein the at least one claw portion has a bifurcated tip end portion.

3. The fan of claim 2, wherein the at least one radial concave-convex portion is formed such that a convex shape of the at least one radial concave-convex portion is straddled by the tip end portion.

4. The fan of claim 1, wherein a height of a convex shape of the at least one radial concave-convex portion is not larger than a height of a convex shape of the circumferential concave-convex portion.

5. The fan of claim 1, wherein
   the at least one radial concave-convex portion comprises a plurality of radial concave-convex portions, and
   an interval between adjacent radial concave-convex portions of the plurality of radial concave-convex portions is determined so that an angle formed by the rotation axis and the adjacent radial concave-convex portions is not smaller than 0.5 degrees and not larger than 2.5 degrees.

6. The fan of claim 1, wherein the fan is a centrifugal fan.

7. An air-conditioning apparatus comprising the fan of claim 1.

* * * * *